United States Patent
Chien et al.

(10) Patent No.: US 10,812,798 B2
(45) Date of Patent: Oct. 20, 2020

(54) CHROMA QUANTIZATION PARAMETER (QP) OFFSET

(71) Applicant: QUALCOMM Incorporated, San Diego, CA (US)

(72) Inventors: Wei-Jung Chien, San Diego, CA (US); Kai Zhang, San Diego, CA (US); Yi-Wen Chen, San Diego, CA (US); Marta Karczewicz, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 16/156,894

(22) Filed: Oct. 10, 2018

(65) Prior Publication Data

US 2019/0124330 A1    Apr. 25, 2019

Related U.S. Application Data

(60) Provisional application No. 62/574,686, filed on Oct. 19, 2017.

(51) Int. Cl.
| | | |
|---|---|---|
| *H04N 19/124* | (2014.01) | |
| *H04N 19/196* | (2014.01) | |
| *H04N 19/42* | (2014.01) | |
| *H04N 19/70* | (2014.01) | |
| *H04N 19/157* | (2014.01) | |

(Continued)

(52) U.S. Cl.
CPC ......... *H04N 19/124* (2014.11); *H04N 19/103* (2014.11); *H04N 19/157* (2014.11); *H04N 19/174* (2014.11); *H04N 19/186* (2014.11); *H04N 19/196* (2014.11); *H04N 19/42* (2014.11); *H04N 19/70* (2014.11)

(58) Field of Classification Search
CPC ... H04N 19/124; H04N 19/157; H04N 19/186
See application file for complete search history.

(56) References Cited

U.S. PATENT DOCUMENTS

| | | | | |
|---|---|---|---|---|
| 2013/0329785 A1* | 12/2013 | Lim | ...................... | H04N 19/463 375/240.03 |
| 2014/0003497 A1* | 1/2014 | Sullivan | ............... | H04N 19/124 375/240.03 |

(Continued)

OTHER PUBLICATIONS

International Search Report and Written Opinion—PCT/US2018/055566—ISA/EPO—dated Feb. 12, 2019, 15 pages.

(Continued)

*Primary Examiner* — Jeremiah C Halleneck-Huber
(74) *Attorney, Agent, or Firm* — Campbell C. Chiang; Polsinelli LLP

(57) ABSTRACT

Provided are systems, methods, and computer-readable medium for encoding and decoding video data. In various examples, a coding device can include multiple luma QP and chroma QP relationship tables. In performing quantization or inverse quantization one video data being encoded or decoded, respectively, the coding device can select a table. The table can be selected based on, for example, a slice type, a prediction mode, and/or a luminance value, among other factors. The coding device can then use the luma QP value to look up a chroma QP value from the table. The luma QP and chroma QP values can then be used in quantization or inverse quantization.

30 Claims, 9 Drawing Sheets

(51) Int. Cl.
*H04N 19/103* (2014.01)
*H04N 19/174* (2014.01)
*H04N 19/186* (2014.01)

(56) References Cited

U.S. PATENT DOCUMENTS

| | | | | |
|---|---|---|---|---|
| 2015/0003518 A1* | 1/2015 | Nguyen | ............... | H04N 19/186 375/240.03 |
| 2015/0043641 A1* | 2/2015 | Gamei | ................ | H04N 19/593 375/240.12 |
| 2015/0071344 A1* | 3/2015 | Tourapis | .............. | H04N 19/124 375/240.03 |
| 2017/0345187 A1* | 11/2017 | Sato | .................... | H04N 5/2352 |

OTHER PUBLICATIONS

Xu J., et al., "Chroma QP Extension and Signalling Enhancement," Joint Collaborative Team on Video Coding (JCT-VC) of ITU-T SG 16 WP 3 and ISO/IEC JTC 1/SC 29/WG 11, 9th Meeting: Geneva, CH, Apr. 27-May 7, 2012, Document JCTVC-I0265r1, No. m24512, XP030052855, pp. 1-11.

Zhang X., et al., "Method for deriving Chroma QP from Luma QP," Joint Collaborative Team on Video Coding (JCT-VC) of ITU-T SG16 WP3 and ISO/IEC JTC1/SC29/WG11, 6th Meeting: Torino, IT, Jul. 14-22, 2011, document JCTVC-F277, No. m20697, XP030049260, 6 pages.

\* cited by examiner

CHROMA QUANTIZATION PARAMETER (QP) OFFSET

CROSS-REFERENCES TO RELATED APPLICATIONS

This application claim priority to U.S. Provisional Application No. 62/574,686, filed on Oct. 19, 2017, which is hereby incorporated by reference herein in its entirety.

FIELD

This application is generally related to video coding. For example, systems and methods are related to defining chroma quantization parameter (QP) difference (or "offset") in relation to luma QP.

BRIEF SUMMARY

Provided are systems, methods, and computer-readable medium for encoding and decoding video data. In various examples, coding efficiency and/or quality of encoded video can be improved upon by using multiple luma QP and chroma QP relationship tables, and adaptively selecting among the tables according to a current coding situation.

In various examples, methods, coding devices (including encoding devices and decoding devices), computer-readable medium, and apparatuses are described that implement various techniques for encoding video data. These techniques can include obtaining, at an encoding device, video data. The encoding device can include, for example, a memory for storing the video data and a processor configured to perform the described techniques. The techniques can further include selecting, for a portion of the video data, a particular lookup table from a plurality of lookup tables, wherein each of the plurality of lookup tables defines relationships between luma quantization parameter values and chroma quantization parameter values. The techniques can further include determining, for a coding unit from the portion of the video data, a luma quantization parameter value. The techniques can further include determining, for the coding unit, a chroma quantization parameter value, wherein the chroma quantization parameter value is determined by using the luma quantization parameter value to look up the chroma quantization parameter value in the particular lookup table. The techniques can further include performing quantization on the coding unit using the luma quantization parameter value and the chroma quantization parameter value. The techniques can further include generating encoded video data using values determined from performing quantization on the coding unit.

In some aspects, the described techniques can further include determining a slice type for the portion of the video data. In these aspects, the particular lookup table is selected using the slice type.

In some aspects, the described techniques can further include determining a prediction mode for the portion of the video data. In these aspects, the particular lookup table is selected using the prediction mode.

In some aspects, the described techniques can further include determining a luminance value for a pixel in the portion of the video data. In these aspects, the particular lookup table is selected using the luminance value.

In some aspects, the encoded video data includes an index that identifies the particular lookup table.

In some aspects, the described techniques can further include encoding the particular table into the encoded video data.

In some aspects, encoding device the implements the described techniques can include a camera for capturing video data.

In various examples, methods, coding devices (including encoding devices and decoding devices), computer-readable medium, and apparatuses are described that implement various techniques for decoding video data. The techniques can include obtaining, at a coding device, encoded video data. The coding device can include, for example, a memory for storing the encoding video data and a processor configured to perform the described techniques. The techniques can further include selecting, for a portion of the encoded video data, a particular lookup table from a plurality of lookup tables, wherein each of the plurality of lookup tables defines a relationship between luma quantization parameter values and chroma quantization parameter values. The techniques can further include determining, for a coding unit from the portion of the encoded video data, a luma quantization parameter value. The techniques can further include determining, for the coding unit, a chroma quantization parameter value, wherein the chroma quantization parameter value is determined by using the luma quantization parameter value to look up the chroma quantization parameter value in the particular lookup table. The techniques can further include performing inverse quantization on the coding unit using the luma quantization parameter value and the chroma quantization parameter value. The techniques can further include, decoding the portion of the encoded video data using results from performing inverse quantization on the coding unit.

In some aspects, the described techniques can further include determining a slice type for the portion of the encoded video data. In these aspects, the particular lookup table is selected using the slice type.

In some aspects, the described techniques can further include determining a prediction mode for the portion of the encoded video data. In these aspects, the particular lookup table is selected using the prediction mode.

In some aspects, the described techniques can further include determining a luminance value for a pixel in the portion of the encoded video data. In these aspects, the particular lookup table is selected using the luminance value.

In some aspects, the described techniques can further include determining, from the encoded video data, an index. In these aspects, the particular lookup table is selected using the index.

In some aspects, the described techniques can further include decoding the particular lookup table from the encoded video data.

In some aspects the coding device includes a camera for capturing video data. In some aspects, the coding device includes a display for displaying decoded video data. In some aspects, the coding device comprises a mobile device.

In some aspects, an apparatus can include means for performing the described techniques. In these aspects, the apparatus can include, for example, integrated circuitry operable to execute program instructions, where the program instructions can perform steps of the described techniques. The apparatus can further include memories for storing the video data, intermediate values generated when encoding the video data, and/or encoded video data that results from performing the techniques.

BRIEF DESCRIPTION OF THE DRAWINGS

Illustrative embodiments of the present application are described in detail below with reference to the following drawing figures.

DETAILED DESCRIPTION

Figure 1:
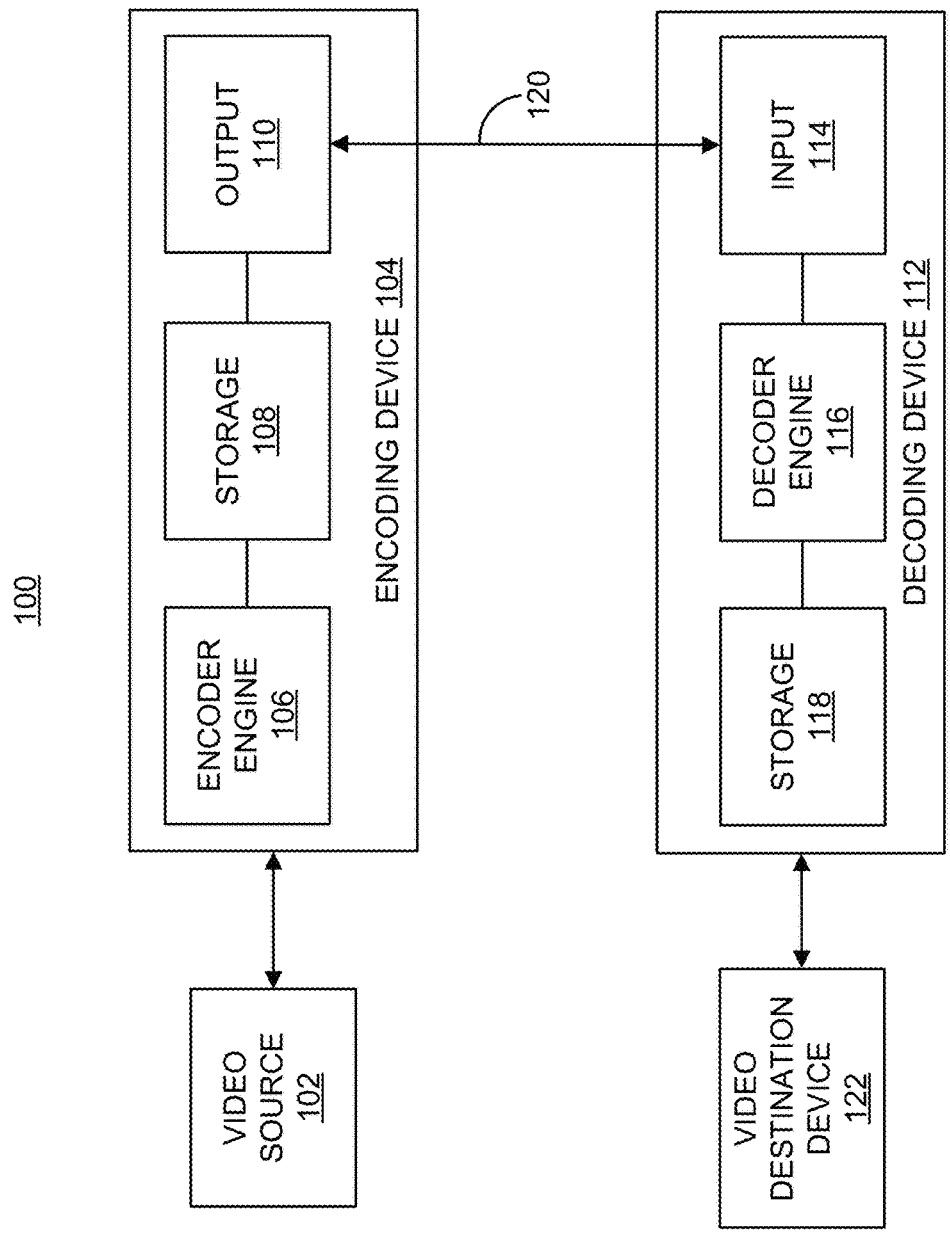
FIG. 1 is a block diagram illustrating an example of an encoding device and a decoding device, in accordance with some examples.

Certain aspects and examples disclosure are provided below. Some of these aspects and examples may be applied independently and some of them may be applied in combination as would be apparent to those of skill in the art. In the following description, for the purposes of explanation, specific details are set forth in order to provide a thorough understanding of the various examples discussed herein. However, it will be apparent that various examples may be practiced without these specific details. The figures and description are not intended to be restrictive.

The ensuing description provides example implementations only, and is not intended to limit the scope, applicability, or configuration of the disclosure. Rather, the ensuing description of the example implementations will provide those skilled in the art with an enabling description for implementing an example implementation. It should be understood that various changes may be made in the function and arrangement of elements without departing from the spirit and scope of the application as set forth in the appended claims.

Specific details are given in the following description to provide a thorough understanding of the examples. However, it will be understood by one of ordinary skill in the art that the examples may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the examples.

Also, it is noted that individual examples may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, examples may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

In various video coding processes, the chroma quantization parameter (QP) is derived from QP value for the luma component. Various video coding processes use a lookup table to perform the derivation, where the luma QP value is used as an index to find a corresponding chroma QP. This lookup table can be referred to as a QP offset table, due to the chroma QP values being defined as an offsets from the luma QP values.

For some video coding processes, the lookup table was defined for lower resolution video sequences and legacy video capture devices (e.g., those capturing 1080p or lower resolutions). In higher resolution video sequences, such as high-definition (HD) and ultra-high-definition (UHD) video, the differences in chroma values between neighboring pixels may be smaller, such that the chroma component of a picture can be smoother than the luma component. Using lookup tables defined for the lower-resolution video sequences, however, can result in loss of detail in the chroma component.

Systems and methods are described herein for defining a chroma quantization parameter (QP) difference (offset) in relation to Luma QP. Such systems and methods can be used in the context of advanced video codecs, which can include, for example, HEVC codecs, codecs using extensions of HEVC, codecs using the next generation of video coding standards, and/or other suitable video codec. In various examples, instead of using a fixed QP offset table, a video coding system can adaptively select from among multiple QP offset tables. For example, the video coding system can use a slice type, a prediction mode, or a luminance value to select a QP offset table. By using these and other selection criteria, chroma QP values that better reflect the content of a video frame can be used.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, an Internet Protocol (IP) camera, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multi-view Video Coding (MVC) extensions. In addition, a new video coding standard, namely High Efficiency Video Coding (HEVC), has been developed by the Joint Collaboration Team on Video Coding (JCT-VC) of ITU-T Video Coding Experts Group (VCEG) and ISO/IEC Motion Picture Experts Group (MPEG). The latest HEVC draft specification, and referred to as HEVC WD hereinafter, is available from http://phenix.int-evry.fr/jct/doc end user/documents/14 Vienna/wg11/JCTVC-N1003-vl.zip. ITU-T VCEG (Q6/16) and ISO/IEC MPEG (JTC 1/SC 29/WG 11) are now studying the potential need for standardization of future video coding technology with a compression capability that significantly exceeds that of the current HEVC standard (including its current extensions and near-term extensions for screen content coding and high-dynamic-range coding). The groups are working together on this exploration activity in a joint collaboration effort known as the Joint Video Exploration Team (JVET) to evaluate compression technology designs proposed by their experts in this area. The JVET first met during 19-21 Oct. 2015. And the latest version of reference software, i.e., Joint Exploration Model 5.0.1 (JEM 5.0.1) is available at https://jvet.h-hi.fraunhofer.de/svn/svn_HMJEMSoftware/tags/HM-16.6-JEM-5.0.1/.

Many examples described herein provide examples using the JEM model, the HEVC standard, and/or extensions thereof. However, the techniques and systems described herein may also be applicable to other coding standards, such as AVC, MPEG, extensions thereof, or other suitable coding standards already available or not yet available or developed. Accordingly, while the techniques and systems described herein may be described with reference to a particular video coding standard, one of ordinary skill in the art will appreciate that the description should not be interpreted to apply only to that particular standard. Herein, video coding can refer to encoding and/or decoding.

Referring to FIG. 1, a video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "video bitstream" or "bitstream") is a series of one or more coded video sequences. A coded video sequence (CVS) includes a series of access units (AUs) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. Coded slices of pictures are encapsulated in the bitstream level into data units called network abstraction layer (NAL) units. For example, an HEVC video bitstream may include one or more CVSs including NAL units. Each of the NAL units has a NAL unit header. In one example, the header is one-byte for H.264/AVC (except for multi-layer extensions) and two-byte for HEVC. The syntax elements in the NAL unit header take the designated bits and therefore are visible to all kinds of systems and transport layers, such as Transport Stream, Real-time Transport (RTP) Protocol, File Format, among others.

Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. In some cases, a NAL unit can be referred to as a packet. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma component or a chroma component that uses the same motion parameters for inter-prediction or intra-block copy prediction (when available or enabled for use). The luma PB and one or more chroma PBs, together with associated syntax, form a prediction unit (PU). For inter-prediction, a set of motion parameters (e.g., one or more motion vectors, reference indices, or the like) is signaled in the bitstream for each PU and is used for inter-prediction of the luma PB and the one or more chroma PBs. The motion parameters can also be referred to as motion information. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding mode and may be square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some examples, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction unit or prediction block is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Intra-prediction utilizes the correlation between spatially neighboring samples within a picture. For example, using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Inter-prediction uses the temporal correlation between pictures in order to derive a motion-compensated prediction for a block of image samples. For example, using inter-prediction, each PU is predicted using motion compensation prediction from image data in one or more reference pictures (before or after the current picture in output order). The decision whether to code a picture area using inter-picture or intra-picture prediction may be made, for example, at the CU level.

In some examples, the one or more slices of a picture are assigned a slice type. Slice types include an I slice, a P slice, and a B slice. An I slice (intra-frames, independently decodable) is a slice of a picture that is only coded by intra-prediction, and therefore is independently decodable since the I slice requires only the data within the frame to predict any prediction unit or prediction block of the slice. A P slice (uni-directional predicted frames) is a slice of a picture that may be coded with intra-prediction and with uni-directional inter-prediction. Each prediction unit or prediction block within a P slice is either coded with Intra prediction or inter-prediction. When the inter-prediction applies, the prediction unit or prediction block is only predicted by one reference picture, and therefore reference samples are only from one reference region of one frame. A B slice (bi-directional predictive frames) is a slice of a picture that may be coded with intra-prediction and with inter-prediction (e.g., either bi-prediction or uni-prediction). A prediction unit or prediction block of a B slice may be bi-directionally predicted from two reference pictures, where each picture contributes one reference region and sample sets of the two reference regions are weighted (e.g., with equal weights or with different weights) to produce the prediction signal of the bi-directional predicted block. As explained above, slices of one picture are independently coded. In some cases, a picture can be coded as just one slice.

A PU may include the data (e.g., motion parameters or other suitable data) related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector ($\Delta x$), a vertical component of the motion vector ($\Delta y$), a resolution for the motion vector (e.g., integer precision, one-quarter pixel precision or one-eighth pixel precision), a reference picture to which the motion vector points, a reference index, a reference picture list (e.g., List 0, List 1, or List C) for the motion vector, or any combination thereof.

The encoding device 104 may then perform transformation and quantization. For example, following prediction, the encoder engine 106 may calculate residual values corresponding to the PU. Residual values may comprise pixel difference values between the current block of pixels being coded (the PU) and the prediction block used to predict the current block (e.g., the predicted version of the current block). For example, after generating a prediction block (e.g., issuing inter-prediction or intra-prediction), the encoder engine 106 can generate a residual block by subtracting the prediction block produced by a prediction unit from the current block. The residual block includes a set of pixel difference values that quantify differences between pixel values of the current block and pixel values of the prediction block. In some examples, the residual block may be represented in a two-dimensional block format (e.g., a two-dimensional matrix or array of pixel values). In such examples, the residual block is a two-dimensional representation of the pixel values.

Any residual data that may be remaining after prediction is performed is transformed using a block transform, which may be based on discrete cosine transform, discrete sine transform, an integer transform, a wavelet transform, other suitable transform function, or any combination thereof. In some cases, one or more block transforms (e.g., sizes 32×32, 16×16, 8×8, 4×4, or other suitable size) may be applied to residual data in each CU. In some examples, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some examples, following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded video bitstream includes quantized transform coefficients, prediction information (e.g., prediction modes, motion vectors, block vectors, or the like), partitioning information, and any other suitable data, such as other syntax data. The different elements of the coded video bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a vector (e.g., a one-dimensional vector), the encoder engine 106 may entropy encode the vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

As previously described, an HEVC bitstream includes a group of NAL units, including VCL NAL units and non-VCL NAL units. VCL NAL units include coded picture data forming a coded video bitstream. For example, a sequence of bits forming the coded video bitstream is present in VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). Examples of goals of the parameter sets include bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence (CVS) or bitstream. As previously described, a coded video sequence is a series of access units (AUs) that starts with a random access point picture (e.g., an instantaneous decode reference (IDR) picture or broken link access (BLA) picture, or other appropriate random access point picture) in the base layer and with certain properties (described above) up to and not including a next AU that has a random access point picture in the base layer and with certain properties (or the end of the bitstream). The information in an SPS may not change from picture to picture within a coded video sequence. Pictures in a coded video sequence may use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

A video bitstream can also include Supplemental Enhancement Information (SEI) messages. For example, an SEI NAL unit can be part of the video bitstream. In some cases, an SEI message can contain information that is not needed by the decoding process. For example, the information in an SEI message may not be essential for the decoder to decode the video pictures of the bitstream, but the decoder can be use the information to improve the display or processing of the pictures (e.g., the decoded output). The information in an SEI message can be embedded metadata. In one illustrative example, the information in an SEI message could be used by decoder-side entities to improve the viewability of the content. In some instances, certain application standards may mandate the presence of such SEI messages in the bitstream so that the improvement in quality can be brought to all devices that conform to the application standard (e.g., the carriage of the frame-packing SEI message for frame-compatible plano-stereoscopic 3DTV video format, where the SEI message is carried for every frame of the video, handling of a recovery point SEI message, use of pan-scan scan rectangle SEI message in DVB, in addition to many other examples).

The output 110 of the encoding device 104 may send the NAL units making up the encoded video bitstream data over the communications link 120 to the decoding device 112 of the receiving device. The input 114 of the decoding device 112 may receive the NAL units. The communications link 120 may include a channel provided by a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video bitstream data may be modulated according to a communication standard, such as a wireless communication protocol, and transmitted to the receiving device.

In some examples, the encoding device 104 may store encoded video bitstream data in storage 108. The output 110 may retrieve the encoded video bitstream data from the encoder engine 106 or from the storage 108. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 of the decoding device 112 receives the encoded video bitstream data and may provide the video bitstream data to the decoder engine 116, or to storage 118 for later use by the decoder engine 116. The decoder engine 116 may decode the encoded video bitstream data by entropy decoding (e.g., using an entropy decoder) and extracting the elements of one or more coded video sequences making up the encoded video data. The decoder engine 116 may then rescale and perform an inverse transform on the encoded video bitstream data. Residual data is then passed to a prediction stage of the decoder engine 116. The decoder engine 116 then predicts a block of pixels (e.g., a PU). In some examples, the prediction is added to the output of the inverse transform (the residual data).

The decoding device 112 may output the decoded video to a video destination device 122, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

Supplemental Enhancement Information (SEI) messages can be included in video bitstreams. For example, SEI messages may be used to carry information (e.g., metadata) that is not essential in order to decode the bitstream by the decoding device 112. This information is useful in improving the display or processing of the decoded output (e.g. such information could be used by decoder-side entities to improve the viewability of the content).

In some examples, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 8. An example of specific details of the decoding device 112 is described below with reference to FIG. 9.

As noted above, extensions to the HEVC standard include the Multi-view Video Coding extension (referred to as MVC or MV-HEVC), and the Scalable Video Coding extension (referred to as SVC or SHVC). The MVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard. In general, a layer includes a set of VCL NAL units and a corresponding set of non-VCL NAL units. The NAL units are assigned a particular layer ID value. Layers can be hierarchical in the sense that a layer may depend on a lower layer.

As noted above, during encoding of video data, an encoder can perform quantization on transform coefficients, which are derived from residual values that result from motion estimation and/or motion prediction. In analog to digital conversion, quantization is a process by which analog values are rounded off to values that are approximately equal to the analog values. The rounding process can result in a series of discrete, digital values that approximate an analog signal. The discrete amplitudes of the quantized output can be called representation levels or reconstruction levels. The spacing between two adjacent levels can be called the quantum or step-size. Smaller step sizes result in a closer approximation of the analog signal and a larger number of quantized output values, and thus a less compressed output. Larger step sizes result in a less accurate representation of the analog size and fewer quantized output values, and thus a more compressed output.

In various video coding processes, the luma color component of a pixel and the chroma color components are quantized separately. Some video coding processes include a procedure for deriving luma QP value, where the luma QP used for a coding block can depend on, for example, the coding block's location in the video data, a previous luma QP value used, and/or an encoding quality that was selected for the video data.

In various examples, the chroma QP value is derived from the luma QP using a lookup table. Table 1 below illustrates an example of such a lookup table. The lookup table of Table 1 provides chroma QP values for luma QP values defined for the HEVC standard. In various examples, the same table is used for all slice types and all encoding modes. In some examples, an additional chroma QP offset can be signaled (e.g., provided in) a slice header to change the luma QP-to-chroma QP relationship for all the blocks that are in the slice.

TABLE 1

| Luma QP | 0 | 1 | 2 | 3 | 4 | 5 | 6 | 7 | 8 |
|---|---|---|---|---|---|---|---|---|---|
| Chroma QP | 0 | 1 | 2 | 3 | 4 | 5 | 6 | 7 | 8 |
| Luma QP | 9 | 10 | 11 | 12 | 13 | 14 | 15 | 16 | 17 |
| Chroma QP | 9 | 10 | 11 | 12 | 13 | 14 | 15 | 16 | 17 |
| Luma QP | 18 | 19 | 20 | 21 | 22 | 23 | 24 | 25 | 26 |
| Chroma QP | 18 | 19 | 20 | 21 | 22 | 23 | 24 | 25 | 26 |
| Luma QP | 27 | 28 | 29 | 30 | 31 | 32 | 33 | 34 | 35 |
| Chroma QP | 27 | 28 | 29 | 29 | 30 | 31 | 32 | 33 | 33 |
| Luma QP | 36 | 37 | 38 | 39 | 40 | 41 | 42 | 43 | 44 |
| Chroma QP | 34 | 34 | 35 | 35 | 36 | 36 | 37 | 37 | 38 |
| Luma QP | 45 | 46 | 47 | 48 | 49 | 50 | 51 | 52 | 53 |
| Chroma QP | 39 | 40 | 41 | 42 | 43 | 44 | 45 | 46 | 47 |
| Luma QP | 54 | 55 | 56 | 57 | | | | | |
| Chroma QP | 48 | 49 | 50 | 51 | | | | | |

In various coding standards, luma QP-to-chroma-QP offsets such as those provided in Table 1 were defined for smaller resolution video sequences and legacy video capture devices. At smaller resolutions, the difference in chroma values between neighboring pixels may be relatively large. In high-definition (HD) and ultra-high-definition (UHD) video sequences, the differences in chroma values between neighboring pixels may be smaller, such that the chroma component of a picture can be smoother than the luma component.

Figure 2:
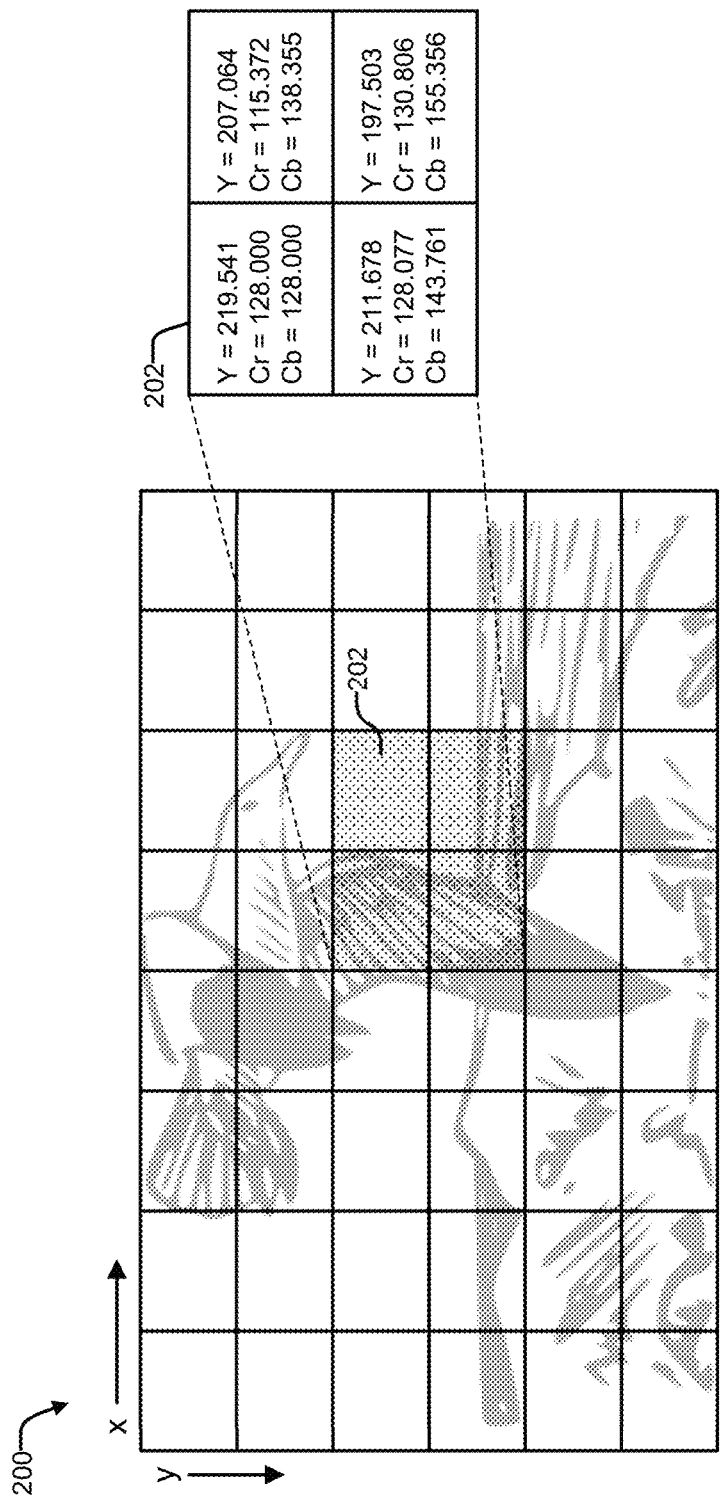
FIG. 2 includes a diagram of a lower resolution video frame.

FIG. 2 includes a diagram of a lower resolution video frame 200. "Lower resolution," in this context, means less than HD quality, such as 720 pixels wide and 576 pixels high, or less. The width and height of the video frame 200 is illustrated in the example of FIG. 2 by variables x and y, respectively. The grid drawn over the video frame 200 illustrates representative pixel locations. A fewer number of pixel locations are illustrated than would be present in many lower resolution video frames, for the sake of clarity.

FIG. 2 further illustrates an example of the luma (Y) and chroma (Cr, Cb) values for set of four neighboring pixels 202. As illustrated by this example, between this set of neighboring pixels 202, the chroma values can have large transitions from one pixel to the neighboring pixel, due to the neighboring pixels capturing different information. The luma and chroma values in this example are merely illustrative of possible color values in a video frame. Luma and chroma values with smaller and larger variations between neighboring pixels can also occur, depending on the content of the video frame.

Figure 3:
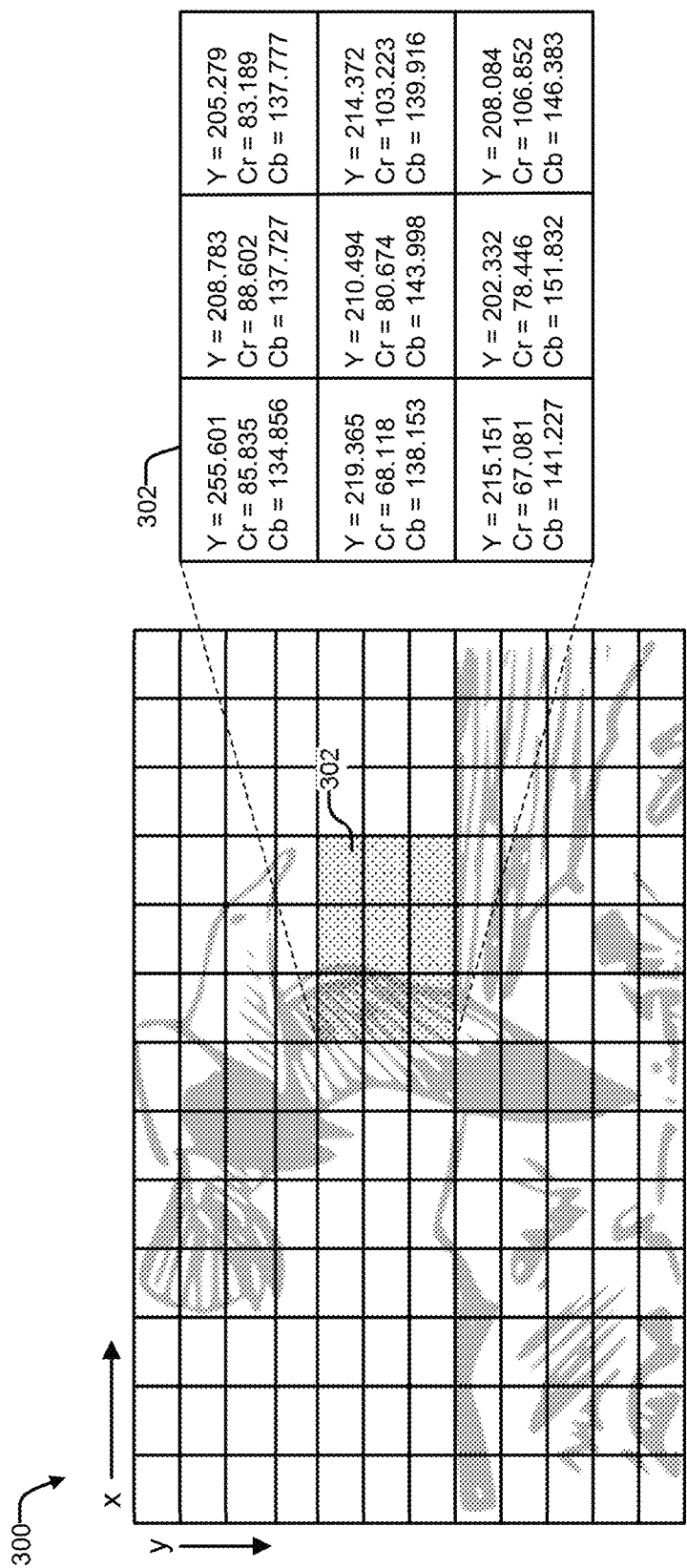
FIG. 3 includes a diagram of a higher resolution video frame.

FIG. 3 includes a diagram of a higher resolution video frame 300. "Higher resolution," in this context, means at least HD quality, or at least 1280 pixels wide by 720 pixels high. The width and height of the video frame 300 are illustrated by variables x and y, respectively. The grid drawn over the video frame 300 illustrates representative pixel locations, with fewer than an actual number of pixel locations being illustrated, for the sake of clarity.

FIG. 3 further illustrates example luma and chroma values for a set of nine neighboring pixels 302. In this example, the transitions between the chroma values across the set of neighboring pixels changes more gradually than in the example of FIG. 2. This more gradual change reflects the higher degree of detail captured in the video frame 300 of FIG. 3.

The fixed QP offset table illustrated in the example of Table 1 may be adequate for lower resolution video frames, where chroma values can vary greatly between neighboring pixels. In higher resolution video, however, the fixed QP offset table can result in undesirable loss of detail. Chroma QP values that accommodate smaller changes in the chroma values can preserve more detail. Additionally, improved video coding techniques can improve the coding efficiency (e.g., the degree by which the data is compressed through the encoding process) of chroma components, such that capturing greater detail does not need to result in an increase in the size of the encoded data. As an example, use of a Linear Model (LM) mode (or "chroma prediction mode"), which predicts one or more chroma components from one or more reconstructed luma components, can improve the coding efficiency of the chroma components. Using techniques such as these, the chroma components cab have less reconstruction distortion than the luma components.

In various examples, video coding processes and devices can adaptively select chroma QP values. For example, different lookup tables can be used for different situations, where the lookup table provides a relationship between luma QP and chroma QP values. A different lookup table can be selected, for example, based on the current slice type and/or the current prediction mode, among other factors. In some examples, a luminance value can be used, in addition to or instead of the slice type and/or prediction mode, to select a luma QP and chroma QP relationship table. The human visual system can have different sensitivity levels for color under different luminance conditions. Using luminance as a factor in selecting chroma QP values can thus improve coding efficiency and/or better capture color details that can be seen by the human eye.

As an example, the current prediction mode can be used to select a luma QP and chroma QP relationship table. For example, when the prediction mode for a current slice is an intra-picture mode, Table 1 above can be used to select chroma QP values using luma QP values, and when the current prediction mode is an inter-prediction mode (e.g., as may be the case of P-slices and B-slices), the example values in Table 2 below can be used. In this example, QP differences are reduced for slices being predicted with inter-prediction when the luma QP values are high, as compared to the QP differences used for intra-predicted slices.

TABLE 2

| Luma QP | 0 | 1 | 2 | 3 | 4 | 5 | 6 | 7 | 8 |
|---|---|---|---|---|---|---|---|---|---|
| Chroma QP | 0 | 1 | 2 | 3 | 4 | 5 | 6 | 7 | 8 |
| Luma QP | 9 | 10 | 11 | 12 | 13 | 14 | 15 | 16 | 17 |
| Chroma QP | 9 | 10 | 11 | 12 | 13 | 14 | 15 | 16 | 17 |
| Luma QP | 18 | 19 | 20 | 21 | 22 | 23 | 24 | 25 | 26 |

TABLE 2-continued

| Chroma QP | 18 | 19 | 20 | 21 | 22 | 23 | 24 | 25 | 26 |
|---|---|---|---|---|---|---|---|---|---|
| Luma QP | 27 | 28 | 29 | 30 | 31 | 32 | 33 | 34 | 35 |
| Chroma QP | 27 | 28 | 29 | 29 | 30 | 31 | 32 | 33 | 33 |
| Luma QP | 36 | 37 | 38 | 39 | 40 | 41 | 42 | 43 | 44 |
| Chroma QP | 34 | 35 | 36 | 36 | 37 | 37 | 38 | 39 | 40 |
| Luma QP | 45 | 46 | 47 | 48 | 49 | 50 | 51 | 52 | 53 |
| Chroma QP | 41 | 42 | 43 | 44 | 45 | 46 | 47 | 48 | 49 |
| Luma QP | 54 | 55 | 56 | 57 | | | | | |
| Chroma QP | 50 | 51 | 52 | 53 | | | | | |

In various examples, different luma QP and chroma QP relationship tables can, alternatively or additionally, be used at the block level. For example, Table 1 can be used for intra-predicted blocks, and Table 2 can be used for inter-predicted blocks. As another example, Table 1 can be used for intra-predicted blocks, and Table 2 can be used for blocks predicted with LM mode and/or inter-predicted blocks.

In some examples, different luma QP and chroma QP relationship tables can, alternatively or additionally, be used for pictures coded in different temporal layers (e.g., pictures with different temporal layer identifiers).

In various, different or additional lookup tables to Table 1 and Table 2 can be defined, which can be selected from at each the block, slice, picture, or temporal layer.

In various examples, the luma QP and chroma QP relationship tables can be predefined, such that encoders and decoders can each have copies of the tables. In these examples, the tables would not need to be signaled (e.g., encoded and/or transmitted) from an encoder to a decoder. Instead, an index can be signaled from the encoded to the decoder to indicate which table to apply, and at which level the table is to be applied. For example, the encoder can indicate a lookup table to apply at the sequence level (e.g., in a Sequence Parameter Set (SPS)), at the picture level (e.g., in a Picture Parameter Set (PPS)), at the slice level (e.g., in a Slice header), at the block level (e.g., in Coding Tree Unit (CTU), Coding Unit (CU), Transform Unit (TU) or at any other suitable block level), and/or at any other suitable level. In some cases, the index can be signaled in a supplemental enhancement information (SEI) message.

In some examples, one or more luma QP and chroma QP relationship tables can sent from the encoder to the decoder. The encoder can transmit a table at any level, such as at the sequence level (e.g., in a Sequence Parameter Set (SPS)), at the picture level (e.g., in a Picture Parameter Set (PPS), at slice level (e.g., in a Slice header), as a Supplemental Enhancement Information (SEI) message, and/or as a video usability information (VUI).

Figure 4:
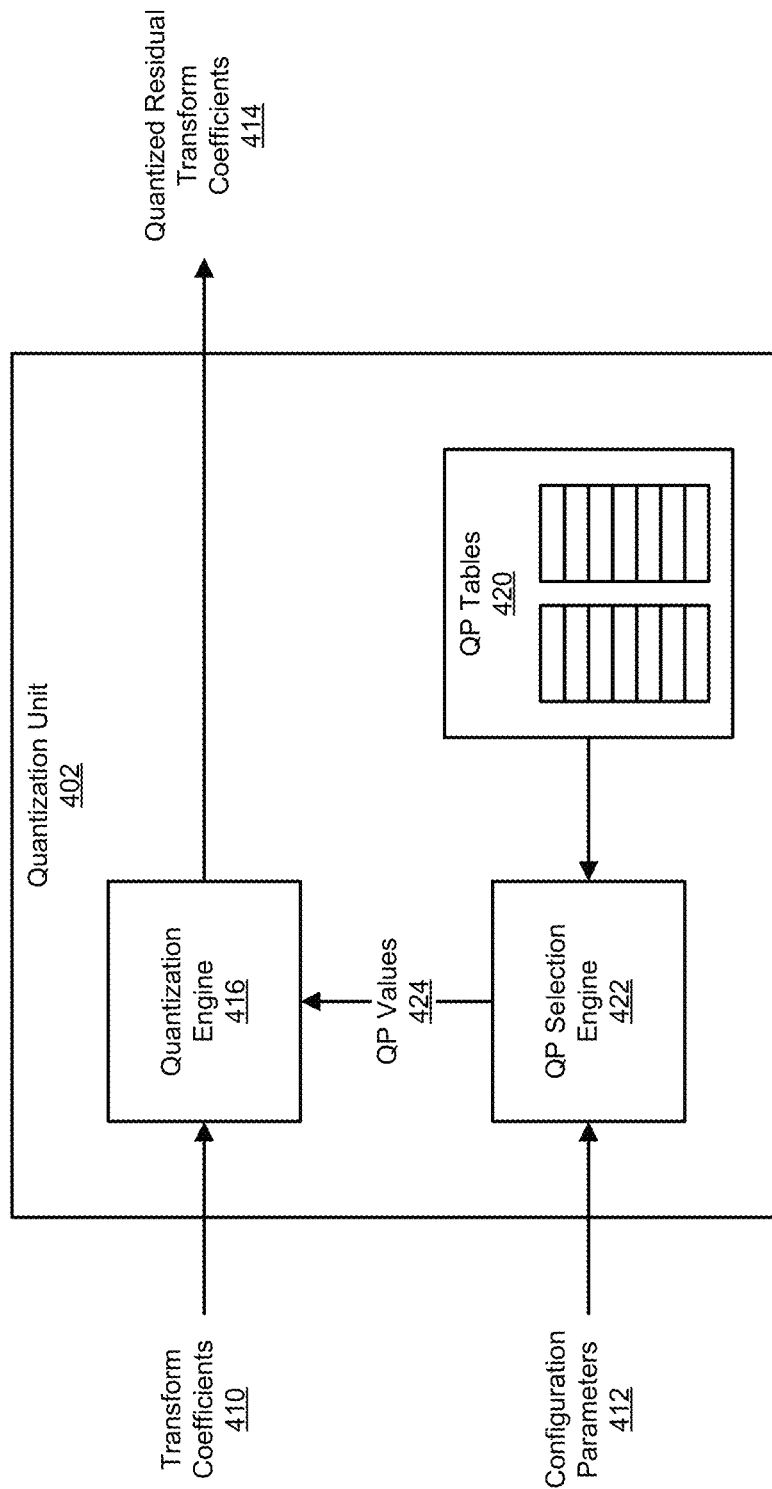
FIG. 4 includes a block diagram of a quantization unit that can be included in an encoding device.

In various examples, an encoding device can be configured to adaptively use multiple luma QP and chroma QP relationship tables. FIG. 4 includes a block diagram of a quantization unit 402 that can be included in an encoding device. As discussed further below, the encoding device can include the quantization unit 402 among other components that the encoding device uses to encode video data. In various examples, the quantization unit 402 receives transform coefficients 410 from a transform processing unit, and outputs quantized residual transform coefficients 414. The quantized residual transform coefficients 414 can undergo entropy encoding before being added to an encoded bitstream.

In the example of FIG. 4, the quantization unit 402 includes multiple QP tables 420, which can include, for example, Table 1 and Table 2 as discussed above, and/or other tables. The QP tables 420 can be stored, for example, in a memory of the encoding device and/or can be loaded from a storage drive. The quantization unit 402 also includes a QP selection engine 422, which receives configuration parameters 412 that can be used to select QP values 424 to use in a quantization engine 416. In contrast, other quantization unit implementations may include only one QP table and a simpler QP selection engine that only needs to perform lookups within the one QP table.

In various examples, the configuration parameters 412 can be derived from the current coding state of the encoding device. For example, the configuration parameters 412 can indicate, for a current coding unit, a current slice type, a current prediction mode, and/or a current luminance value, among other parameters. In this and other examples, the QP selection engine 422 can use one or more of the configuration parameters 412 to select a particular QP table from among the available QP tables 420. In various examples, the configuration parameters 412 an also include a current luma QP value, which the QP selection engine 422 can use to look up a chroma QP value from the selected QP table.

Having determined a chroma QP value, the QP selection engine 422 can provide the luma QP and chroma QP values 424 to a quantization engine 416. The quantization engine 416 can use the QP values 424 to perform a quantization on the transform coefficients 410 to produce the quantized residual transform coefficients 414.

Figure 5:
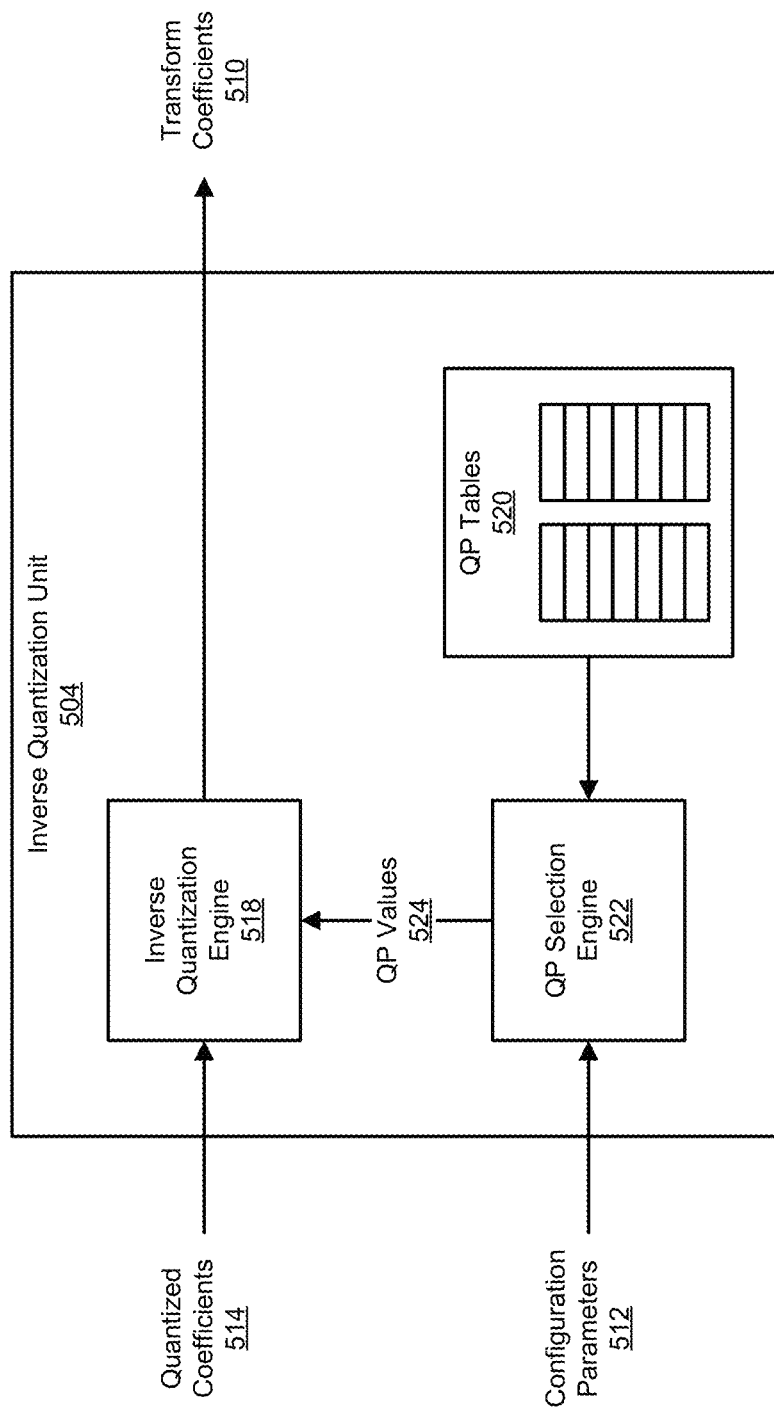
FIG. 5 includes a block diagram illustrating an example of an inverse quantization unit that can be included in an encoding device or a decoding device.

FIG. 5 includes a block diagram illustrating an example of an inverse quantization unit 504 that can be included in an encoding device or a decoding device (either of which can be referred to as a coding device). An encoding device can include an inverse quantization unit 504 for generating reconstructed blocks, which can be used in prediction processing. A decoding device can include an inverse quantization unit 504 to reconstruct the residual data that was determined in the encoding process. In both cases, the inverse quantization unit 504 performs the inverse of the quantization performed by the quantization unit of FIG. 4, as a step in performing the reverse of the encoding process to reconstruct, as best as possible, the original video data.

The inverse quantization unit 504 receives as input quantized coefficients 514. In an encoding device, the quantized coefficients 514 can be output by a quantization unit. In a decoding device, the quantized coefficients 514 an entropy decoding unit, which can perform entropy decoding on an encoded video bitstream to product syntax elements and the quantized coefficients 514. The inverse quantization unit 504 can output transform coefficients 510, which a coding device can input into an inverse transform processing unit to produce residual data.

In the example of FIG. 5, the inverse quantization unit 504 includes multiple QP tables 520, which can include, for example, Table 1 and Table 2 as discussed above, and/or other tables. The QP tables 520 can be stored, for example, in a memory of the coding device and/or can be loaded from a storage drive. The inverse quantization unit 504 also includes a QP selection engine 522, which receives configuration parameters 512 that can be used to determine QP values 524 to use in an inverse quantization engine 518. In contrast, other inverse quantization unit implementations may include only one QP table and a QP selection engine that only need to perform lookups in the one QP table.

In various examples, the configuration parameters 512 can indicate a current decoding parameters. For example, the configuration parameters 512 can indicate, for a current coding unit, a current slice type, a current prediction mode, and/or a current luminance value, among other parameters. In this and other examples, the QP selection engine 522 can use one or more of the configuration parameters 512 to select a particular QP table from among the QP tables 520. Alternatively or additionally, the configuration parameters 512 can include an index that identifies a particular QP table from the QP tables 520. The index can have been determined by a quantization unit that determined the QP table to use, and can have been included in the encoded video data.

In various examples, the configuration parameters 512 can also include a luma QP value. In these examples, the QP selection engine 522 can determine a chroma QP value from the selected QP table. The QP selection engine 522 can further provide the luma QP and the chroma QP to the inverse quantization engine 518. The inverse quantization engine 518 can use the QP values 424 to perform an inverse quantization, and output the transform coefficients 510.

Figure 6:
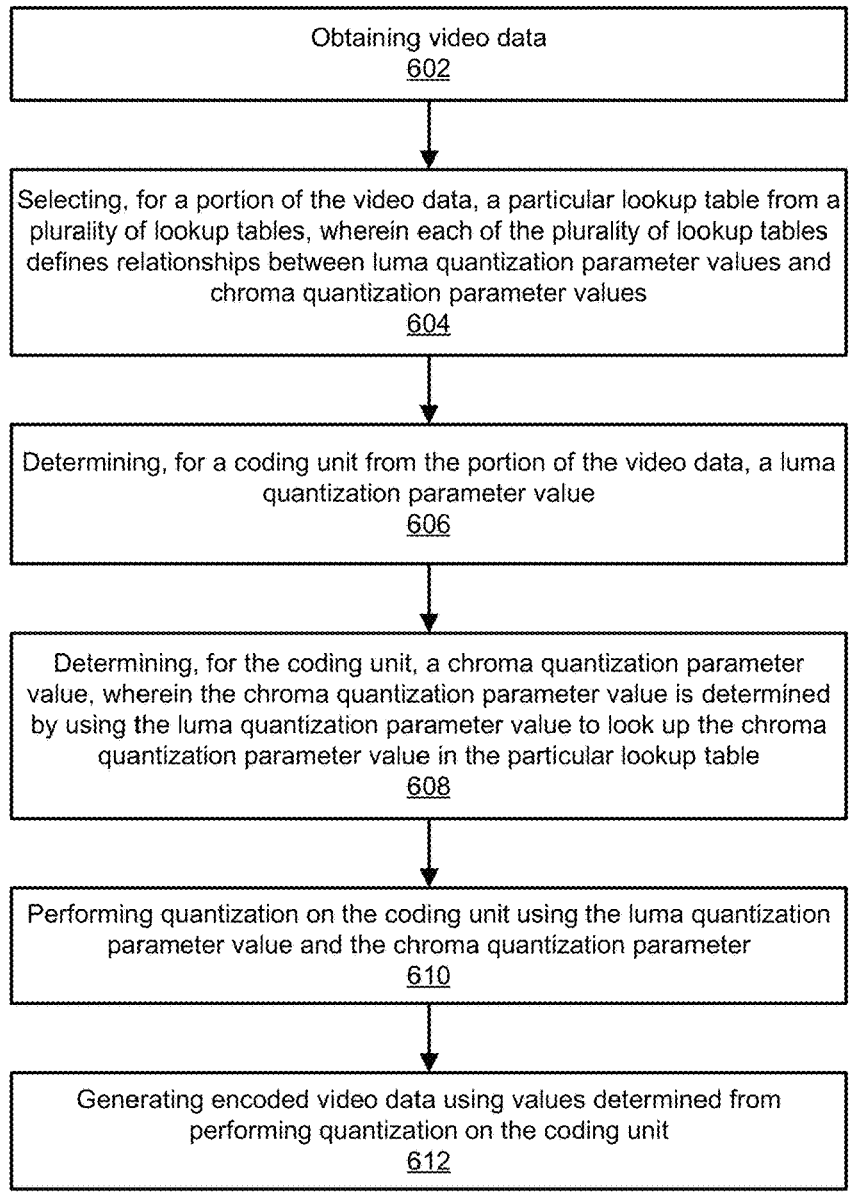
FIG. 6 includes a flowchart illustrating an example of a process for encoding video data.

FIG. 6 includes a flowchart illustrating an example of a process 600 for encoding video data. In various examples, the process 600 can be implemented by an encoding device. An encoding device can include, for example, a processor and a memory for storing video data. In some examples, the encoding device can include a camera for capturing the video data. In some examples, the encoding device is a mobile device, or is included in a mobile device.

At step 602, the process 600 includes obtaining video data. The video data can be obtained, for example, from a video capture device, such as a camera. Alternatively or additionally, in some examples, the video data can be obtained from a storage location, such as a hard disk drive. Alternatively or additionally, in some examples, the video data can be obtained from a network, using, for example, network interface hardware and networking software.

At step 604, the process 600 includes selecting, for a portion of the video data, a particular lookup table from a plurality of lookup tables, wherein each of the plurality of lookup tables defines relationships between luma quantization parameter values and chroma quantization parameter values. The lookup tables can be configured, for example, so that the luma quantization parameter value can be used to look up a corresponding chroma quantization parameter value. In some examples, the chroma quantization parameter value is at an offset from the luma quantization parameter. In various examples, the same lookup tables can be configured for a decoding device, so that the lookup tables do not need to be included in the encoded video data.

In various examples, the encoding device can be pre-configured with a set of lookup tables, where each lookup table defines different chroma quantization parameter values for the possible luma quantization parameter values. In some examples, the process 600 further includes determining a slice type for the portion of the video data. In these examples, the particular lookup table can be selected using the slice type. The slice type can be, for example, I, P, or B, for intra-predicted slices, inter-predicted slices using one reference picture, and inter-predicted slices using two reference pictures, respectively. In some examples, the process 600 further includes determining a prediction mode for the portion of the video data. In these examples, the particular lookup table can be selected using the prediction mode. The prediction mode can be an intra-prediction mode or an inter-prediction mode, for example. In some examples, the process 600 further includes determining a luminance value for a pixel in the portion of the video data. In these examples, the particular lookup table can be selected using the luminance value. The luminance value can, for example, be determined from a representative pixel in the coding unit. Alternatively or additionally, as another example, the luminance value can be an average value for the pixels in the coding unit. Alternatively or additionally, the luminance value can be from a previous coding unit or a reference coding unit. In various examples, other techniques can be used to determine the luminance value.

At step 606, the process 600 includes determining, for a coding unit from the portion of the video data, a luma quantization parameter value. The luma quantization parameter value can be determined, for example, from a previously-used luma quantization parameter value, the location of the portion of the video data within a video frame, and/or an encoding quality level selected for the video data, among other factors.

At step 608, the process 600 includes determining, for the coding unit, a chroma quantization parameter value, wherein the chroma quantization parameter value is determined by using the luma quantization parameter value to look up the chroma quantization parameter value in the particular lookup table.

At step 610, the process 600 includes performing quantization on the coding unit using the luma quantization parameter value and the chroma quantization parameter value. Performing quantization can occur, for example, after the encoding device has performed motion estimation and/or motion compensation to determine residual values for the coding unit. In these examples, quantization can be performed on the residual values. Performing quantization can include using the luma quantization parameter value and the chroma quantization parameter value to reduce luma values and chroma values, respectively, to discrete values.

At step 612, the process 600 includes generating encoded video data using values determined from performing quantization on the coding unit. For example, the values determined from performing quantization can undergo entropy encoding to produce syntax elements that are added to the encoded video data. In various examples, the output of the process 600 is an encoded bitstream, which can be stored, transmitted, and/or decoded for display.

In some examples, the encoded video data includes an index that identifies the particular lookup table. For example, in generating the encoded video data, the encoding device can include the index in the encoded video data. The index can be included, for example, in an SPS NAL unit, a PPS NAL unit, in a slice header, and/or in a block-level indicator, among other possible locations. Alternatively or additionally, the index can be included in an SEI message and/or in a VUI message, among other examples.

In some examples, the process 600 further includes encoding the particular table into the encoded video data. In these examples, the particular table can be included in an SPS NAL unit, in a PPS NAL unit, in a slice header, in an SEI message, and/or in a VUI NAL unit, among other possible locations.

Figure 7:
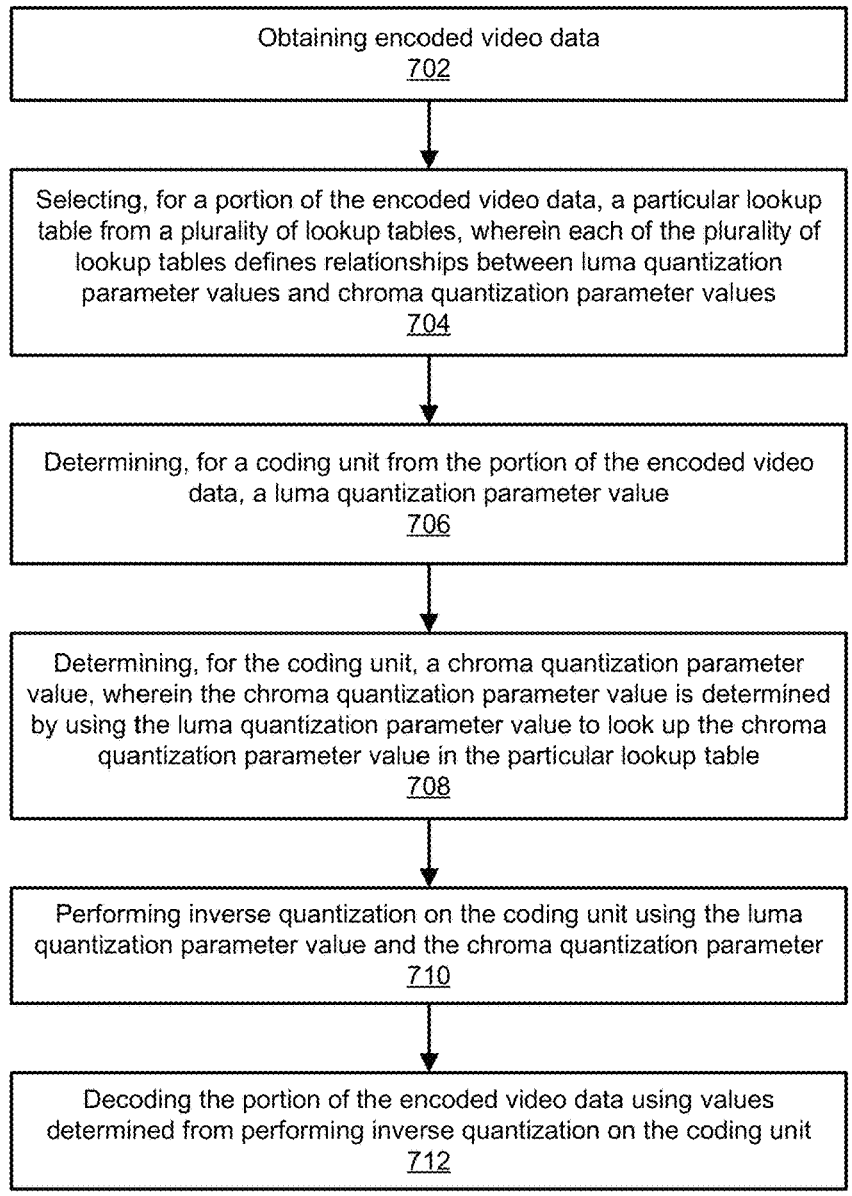
FIG. 7 includes a flowchart illustrating an example of a process for decoding video data.

FIG. 7 includes a flowchart illustrating an example of a process 700 for decoding video data. In various examples, the process 600 can be implemented by an encoding device or a decoding device, either of which can be referred to as a coding device. A coding device can include, for example, a processor and a memory for storing encoded video data. In some examples, the coding device includes a camera for capturing video data and/or a display for displaying decoded video. In some examples, the coding device is a mobile device, or is included in a mobile device.

At step 702, the process 700 includes obtaining encoded video data. The encoded video data can be obtained, for example, from a storage location, such as a memory or a hard disk. Alternatively or additionally, in some examples, the encoded video data can be obtained from a network.

At step 704, the process 700 selecting, for a portion of the encoded video data, a particular lookup table from a plurality of lookup tables, wherein each of the plurality of lookup tables defines a relationship between luma quantization parameter values and chroma quantization parameter values. The lookup tables can be configured, for example, so that the luma quantization parameter value can be used to look up a corresponding chroma quantization parameter value. In some examples, the chroma quantization parameter value is at an offset from the luma quantization parameter. In various examples, a decoding device can be configured with the same lookup tables that were used by an encoding device that encoded the video data, so that the lookup tables do not need to be transmitted to the decoding device.

In various examples, a coding device can be pre-configured with a set of lookup tables, where each lookup table defines different chroma quantization parameter values for the possible luma quantization parameter values. In some examples, the process 700 includes determining a slice type for the portion of the encoded video data. In these examples, the particular lookup table can be selected using the slice type. The slice type can be, for example, one of an I, P, or B slice. In some examples, the process 700 includes determining a prediction mode for the portion of the encoded video data. In these examples, the particular lookup table can be selected using the prediction mode. The prediction mode can be one of multiple different types of intra-prediction modes and inter-prediction modes. In some examples, the process 700 includes determining a luminance value for a pixel in the portion of the encoded video data. In these examples, the particular lookup table can be selected using the luminance value. The luminance value can be a representative luminance value for the coding unit, can be from a previous coding unit, can be from a reference coding unit, and/or can come from another source. In some examples, the process 700 can include determining, from the encoded video data, an index, where the particular lookup table is selected using the index. The index can be included, for example, in an SPS NAL unit, a PPS NAL unit, a slice header, in block-level information, in an SEI message, and/or in a VUI message, among other locations.

In some examples, the process 700 can further include decoding the particular lookup table from the encoded video data. In these examples, the particular lookup table was included in the encoded video data, for example in an SPS NAL unit, a PPS NAL unit, a slice header, in block-level information, in an SEI message, and/or in a VUI message, among other possible locations At step 706, the process 700 includes determining, for a coding unit from the portion of the encoded video data, a luma quantization parameter value. The luma quantization parameter value can be determined from, for example, a previous luma quantization parameter value, a location of the coding unit in a video frame, and/or an encoding value selected for the encoded video data. For example, the luma quantization parameter value can be included in a syntax element in the encoded video data.

At step 708, the process 700 includes determining, for the coding unit, a chroma quantization parameter value, wherein the chroma quantization parameter value is determined by using the luma quantization parameter value to look up the chroma quantization parameter value in the particular lookup table.

At step 710, the process 700 includes performing inverse quantization on the coding unit using the luma quantization parameter value and the chroma quantization parameter value.

At step 712, the process 700 includes decoding the portion of the encoded video data using results from performing inverse quantization on the coding unit. In some examples, performing inverse quantization in an encoding device can occur on quantized transform coefficients that are produced be performing quantization on the transform coefficients. In these examples, performing inverse quantization can be part of reconstructing the residual values determined by motion prediction and/or motion estimation. In a decoding device, various examples, inverse quantization can also be used to reconstruct residual values, which can then be used in the decoding device in motion estimation and motion compensation to reconstruct the original video data. In various examples, the output of decoding the portion of the encoded video data is a portion of the video data from which the encoded video data was generated.

The coding techniques discussed herein may be implemented in an example video encoding and decoding system (e.g., system 100). In some examples, a system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device.

Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above is merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the application have been described.

Figure 8:
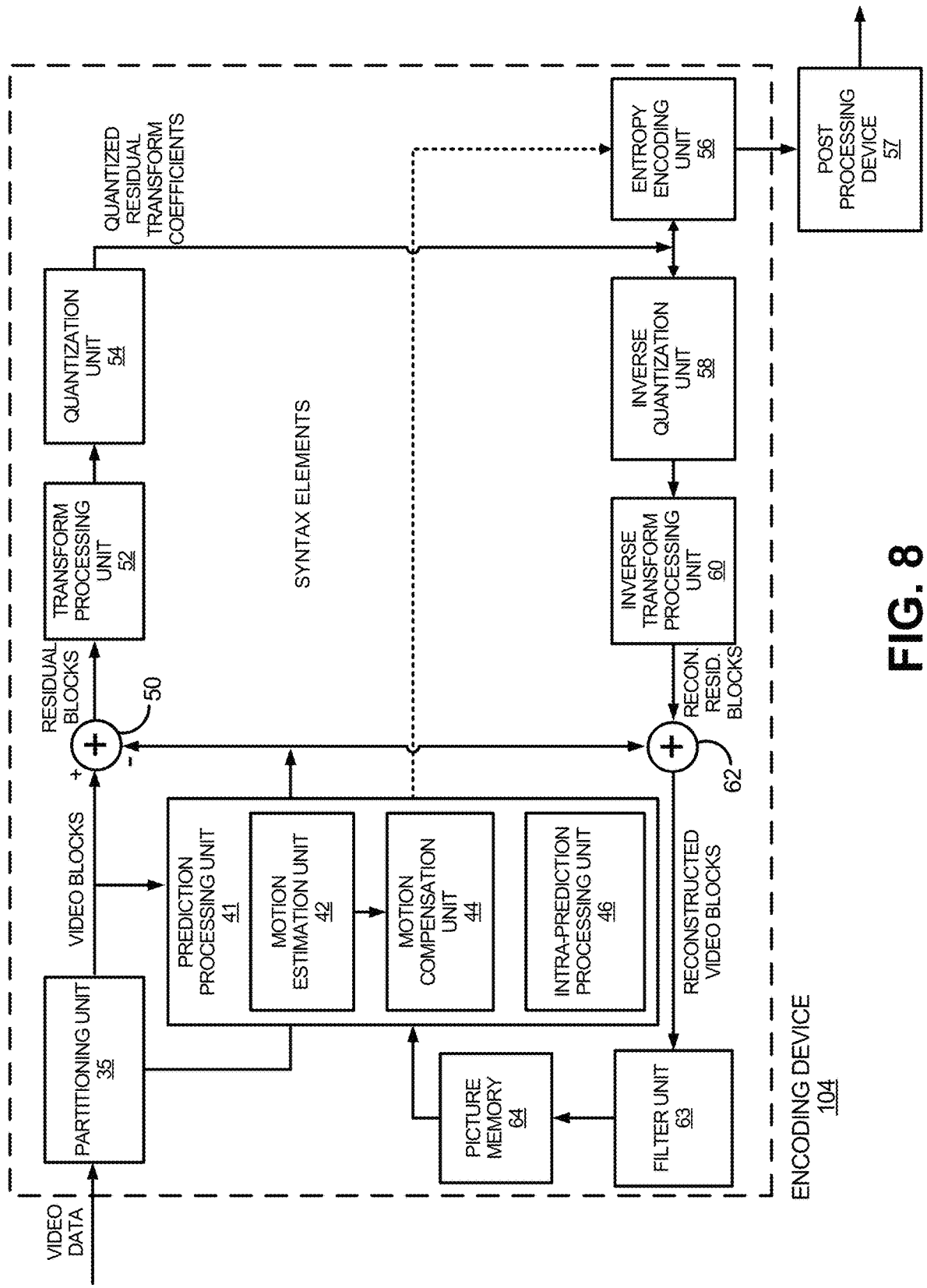
FIG. 8 is a block diagram illustrating an example video encoding device, in accordance with some examples.
Figure 9:
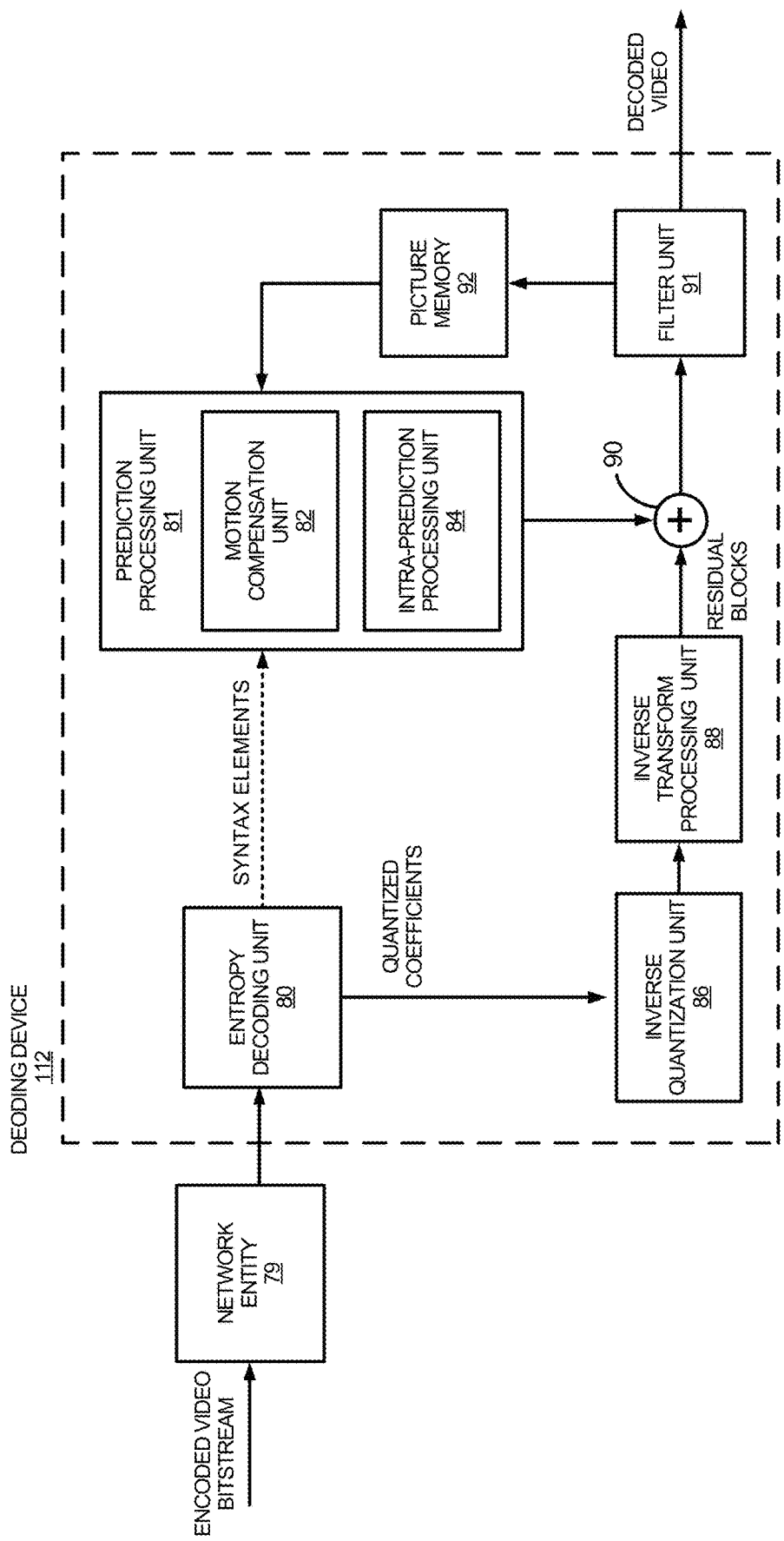
FIG. 9 is a block diagram illustrating an example video decoding device, in accordance with some examples.

Specific details of the encoding device 104 and the decoding device 112 are shown in FIG. 8 and FIG. 9, respectively. FIG. 8 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 8 as being an in loop filter, in other configurations, filter unit 63 may be implemented as a post loop filter. A post processing device 57 may perform additional processing on encoded video data generated by the encoding device 104. The techniques of this disclosure may in some instances be implemented by the encoding device 104. In other instances, however, one or more of the techniques of this disclosure may be implemented by post processing device 57.

As shown in FIG. 9, the encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. The encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, the encoding device 104 may calculate values for sub-integer pixel positions of reference pictures stored in picture memory 64. For example, the encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. The encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by the decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction processing 46 may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. The encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, the encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to the decoding device 112, or archived for later transmission or retrieval by the decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, the encoding device 104 of FIG. 8 represents an example of a video encoder configured to generate syntax for a encoded video bitstream. The encoding device 104 may, for example, generate VPS, SPS, and PPS parameter sets as described above. The encoding device 104 may perform any of the techniques described herein. Some of the techniques of this disclosure may be generally described with respect to the encoding device 104 or the decoding device 112, but as mentioned above, some of the techniques of this disclosure may also be implemented by post processing device 57.

FIG. 9 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. The decoding device 112 may, in some examples, perform a decoding pass generally reciprocal to the encoding pass described with respect to the encoding device 104 from FIG. 8.

During the decoding process, the decoding device 112 receives an encoded video bitstream that represents video blocks of an encoded video slice and associated syntax elements sent by the encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include the encoding device 104. Some of the techniques described in this disclosure may be implemented by network entity 79 prior to network entity 79 transmitting the encoded video bitstream to the decoding device 112. In some video decoding systems, network entity 79 and the decoding device 112 may be parts of separate devices, while in other instances, the functionality described with respect to network entity 79 may be performed by the same device that comprises the decoding device 112.

The entropy decoding unit 80 of the decoding device 112 entropy decodes the bitstream to generate quantized coefficients, motion vectors, and other syntax elements. Entropy decoding unit 80 forwards the motion vectors and other syntax elements to prediction processing unit 81. The decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. The decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by the encoding device 104 during encoding of the video blocks to calculate interpolated values for sub-integer pixels of reference blocks. In this case, motion compensation unit 82 may determine the interpolation filters used by the encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by the encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, the decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 9 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the application is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of encoding video data, comprising:
obtaining, at an encoding device, video data;
determining a prediction mode for encoding a portion of the video data, the prediction mode corresponding to an intra-prediction mode or an inter-prediction mode;
selecting, from a plurality of lookup tables that associate chroma quantization parameter values with luma quantization parameter values, a particular lookup table corresponding to the prediction mode, wherein a chroma quantization parameter associated with a highest luma quantization parameter of a lookup table corresponding to the intra-prediction mode is less than a chroma quantization parameter associated with a highest luma quantization parameter of a lookup table corresponding to the inter-prediction mode;
determining, for a coding unit from the portion of the video data, a luma quantization parameter value;
determining, for the coding unit, a chroma quantization parameter value, wherein the chroma quantization parameter value is determined by using the luma quantization parameter value to look up the chroma quantization parameter value in the particular lookup table;
performing quantization on the coding unit using the luma quantization parameter value and the chroma quantization parameter value; and
generating encoded video data using values determined from performing quantization on the coding unit.

2. The method of claim 1, further comprising:
determining a slice type for the portion of the video data, wherein the particular lookup table is selected using the slice type and the prediction mode.

3. The method of claim 1, further comprising:
determining a temporal layer including the portion of the video data, wherein the particular lookup table is selected using the temporal layer and the prediction mode.

4. The method of claim 1, further comprising:
determining a luminance value for a pixel in the portion of the video data, wherein the particular lookup table is selected using the luminance value and the prediction mode.

5. The method of claim 1, further comprising:
including, in the encoded video data, an index that identifies the particular lookup table from the plurality of lookup tables.

6. The method of claim 1, further comprising:
encoding the particular lookup table into the encoded video data.

7. An encoding device, comprising:
a memory configured to store video data; and
a processor configured to:
determine a prediction mode for encoding a portion of the video data, the prediction mode corresponding to an intra-prediction mode or an inter-prediction mode;
select, from a plurality of lookup tables that associate chroma quantization parameter values with luma quantization parameter values, a particular lookup table corresponding to the prediction mode, wherein a chroma quantization parameter associated with a highest luma quantization parameter of a lookup table corresponding to the intra-prediction mode is less than a chroma quantization parameter associated with a highest luma quantization parameter of a lookup table corresponding to the inter-prediction mode;
determine, for a coding unit from the portion of the video data, a luma quantization parameter value;
determine, for the coding unit, a chroma quantization parameter value, wherein the chroma quantization parameter value is determined by using the luma quantization parameter value to look up the chroma quantization parameter value in the particular lookup table;
perform quantization on the coding unit using the luma quantization parameter value and the chroma quantization parameter value; and
generate encoded video data using values determined from performing quantization on the coding unit.

8. The encoding device of claim 7, wherein the processor is further configured to:
determine a slice type for the portion of the video data, wherein the particular lookup table is selected using the slice type and the prediction mode.

9. The encoding device of claim 7, wherein the processor is further configured to:
determine a temporal layer containing the portion of the video data, wherein the particular lookup table is selected using the temporal layer and the prediction mode.

10. The encoding device of claim 7, wherein the processor is further configured to:
determine a luminance value for a pixel in the portion of the video data, wherein the particular lookup table is selected using the luminance value and the prediction mode.

11. The encoding device of claim 7, wherein the processor is further configured to:
include, in the encoded video data, an index that identifies the particular lookup table from the plurality of lookup tables.

12. The encoding device of claim 7, wherein the processor is further configured to:
encode the particular lookup table, wherein the encoded video data includes the encoded particular lookup table.

13. The encoding device of claim 7, further comprising:
a camera for capturing video data.

14. A non-transitory computer-readable medium having stored thereon instructions that, when executed by one or more processors of an encoding device, cause the one or more processors to perform operations including:
obtaining video data;
determining a prediction mode for encoding a portion of the video data, the prediction mode corresponding to an intra-prediction mode or an inter-prediction mode;
selecting, from a plurality of lookup tables that associate chroma quantization parameter values with luma quantization parameter values, a particular lookup table corresponding to the prediction mode, wherein a chroma quantization parameter associated with a highest luma quantization parameter of a lookup table corresponding to the intra-prediction mode is less than a chroma quantization parameter associated with a highest luma quantization parameter of a lookup table corresponding to the inter-prediction mode;
determining, for a coding unit from the portion of the video data, a luma quantization parameter value;
determining, for the coding unit, a chroma quantization parameter value, wherein the chroma quantization parameter value is determined by using the luma quantization parameter value to look up the chroma quantization parameter value in the particular lookup table;
performing quantization on the coding unit using the luma quantization parameter value and the chroma quantization parameter value; and
generating encoded video data using values determined from performing quantization on the coding unit.

15. A method of decoding video data, comprising:
obtaining, at a coding device, encoded video data;
selecting, from a plurality of lookup tables that associate chroma quantization parameter values with luma quantization parameter values, a particular lookup table corresponding to a prediction mode for encoding a portion of the encoded video data, wherein a chroma quantization parameter associated with a highest luma quantization parameter of a lookup table corresponding to an intra-prediction mode is less than a chroma quantization parameter associated with a highest luma quantization parameter of a lookup table corresponding to an inter-prediction mode;
determining, for a coding unit from the portion of the encoded video data, a luma quantization parameter value;
determining, for the coding unit, a chroma quantization parameter value, wherein the chroma quantization parameter value is determined by using the luma quantization parameter value to look up the chroma quantization parameter value in the particular lookup table;
performing inverse quantization on the coding unit using the luma quantization parameter value and the chroma quantization parameter value; and
decoding the portion of the encoded video data using results from performing inverse quantization on the coding unit.

16. The method of claim 15, further comprising:
determining a slice type for the portion of the encoded video data, wherein the particular lookup table is selected using the slice type and the prediction mode.

17. The method of claim 15, further comprising:
determining a temporal layer that includes the portion of the encoded video data, wherein the particular lookup table is selected using the temporal layer and the prediction mode.

18. The method of claim 15, further comprising:
determining a luminance value for a pixel in the portion of the encoded video data, wherein the particular lookup table is selected using the luminance value and the prediction mode.

19. The method of claim 15, further comprising:
determining, from the encoded video data, an index that identifies the particular lookup table from the plurality of lookup tables; and
selecting the particular lookup table from the plurality of lookup tables using the index.

20. The method of claim 15, further comprising:
decoding the particular lookup table from the encoded video data.

21. A coding device, comprising:
a memory configured to store encoded video data; and
a processor configured to:
select, from a plurality of lookup tables that associate chroma quantization parameter values with luma quantization parameter values, a particular lookup table corresponding to a prediction mode for encoding a portion of the encoded video data, wherein a chroma quantization parameter associated with a highest luma quantization parameter of a lookup table corresponding to an intra-prediction mode is less than a chroma quantization parameter associated with a highest luma quantization parameter of a lookup table corresponding to an inter-prediction mode;
determine, for a coding unit from the portion of the encoded video data, a luma quantization parameter value;
determine, for the coding unit, a chroma quantization parameter value, wherein the chroma quantization parameter value is determined by using the luma quantization parameter value to look up the chroma quantization parameter value in the particular lookup table;
perform inverse quantization on the coding unit using the luma quantization parameter value and the chroma quantization parameter value; and
decode the portion of the encoded video data using results from performing inverse quantization on the coding unit.

22. The coding device of claim 21, wherein the processor is further configured to:
determine a slice type for the portion of the encoded video data, wherein the particular lookup table is selected using the slice type and the prediction mode.

23. The coding device of claim 21, wherein the processor is further configured to:
determine a temporal layer that includes the portion of the encoded video data, wherein the particular lookup table is selected using the temporal layer and the prediction mode.

24. The coding device of claim 21, wherein the processor is further configured to:
determine a luminance value for a pixel in the portion of the encoded video data, wherein the particular lookup table is selected using the luminance value and the prediction mode.

25. The coding device of claim 21, wherein the processor is further configured to:
determine, from the encoded video data, an index that identifies the particular lookup table from the plurality of lookup tables; and
select the particular lookup table from the plurality of lookup tables using the index.

26. The coding device of claim 21, wherein the processor is further configured to:
decode the particular lookup table from the encoded video data.

27. The coding device of claim 21, further comprising: a camera for capturing video data.

28. The coding device of claim 21, further comprising: a display for displaying decoded video data.

29. The coding device of claim 21, wherein the coding device comprises a mobile device with a camera for capturing video data and a display for displaying the video data.

30. A non-transitory computer-readable medium having stored thereon instructions that, when executed by one or more processors of a coding device, cause the one or more processors to perform operations including:
obtaining encoded video data;
selecting, from a plurality of lookup tables that associate chroma quantization parameter values with luma quantization parameter values, a particular lookup table corresponding to a prediction mode for encoding a portion of the encoded video data, wherein a chroma quantization parameter associated with a highest luma quantization parameter of a lookup table corresponding to an intra-prediction mode is less than a chroma quantization parameter associated with a highest luma quantization parameter of a lookup table corresponding to an inter-prediction mode;

determining, for a coding unit from the portion of the encoded video data, a luma quantization parameter value;

determining, for the coding unit, a chroma quantization parameter value, wherein the chroma quantization parameter value is determined by using the luma quantization parameter value to look up the chroma quantization parameter value in the particular lookup table;

performing inverse quantization on the coding unit using the luma quantization parameter value and the chroma quantization parameter value; and decoding the portion of the encoded video data using results from performing inverse quantization on the coding unit.

* * * * *